United States Patent
Naito et al.

(10) Patent No.: US 8,016,070 B2
(45) Date of Patent: Sep. 13, 2011

(54) POWERTRAIN

(75) Inventors: Koji Naito, Nagoya (JP); Akihiko Ikeda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 757 days.

(21) Appl. No.: 10/592,681

(22) PCT Filed: Mar. 29, 2005

(86) PCT No.: PCT/JP2005/006586
§ 371 (c)(1),
(2), (4) Date: Sep. 13, 2006

(87) PCT Pub. No.: WO2005/100069
PCT Pub. Date: Oct. 27, 2005

(65) Prior Publication Data
US 2007/0205035 A1    Sep. 6, 2007

(30) Foreign Application Priority Data

Apr. 16, 2004    (JP) .................................. 2004-121627

(51) Int. Cl.
*B60K 17/22*    (2006.01)
(52) U.S. Cl. ........ 180/380; 180/375; 180/376; 180/292; 180/240
(58) Field of Classification Search .................. 180/374, 180/375, 376, 377, 379, 380, 383, 344, 364, 180/369, 371, 372, 291, 292
See application file for complete search history.

(56) References Cited

U.S. PATENT DOCUMENTS

| | | | | |
|---|---|---|---|---|
| 2,418,744 A * | 4/1947 | Ballamy et al. | ............... | 180/362 |
| 3,401,763 A * | 9/1968 | Rolt | ............... | 180/249 |
| 4,981,193 A * | 1/1991 | Lings | ............... | 180/248 |
| 5,038,885 A * | 8/1991 | Sato et al. | ............... | 180/247 |
| 5,098,360 A * | 3/1992 | Hirota | ............... | 475/237 |
| 5,195,607 A * | 3/1993 | Shimada et al. | ............... | 180/296 |
| 5,205,373 A * | 4/1993 | Kadokura et al. | ............... | 180/248 |
| 5,219,038 A * | 6/1993 | Hamada et al. | ............... | 180/248 |
| 5,267,623 A * | 12/1993 | Kashiwagi | ............... | 180/58 |
| 5,383,531 A * | 1/1995 | Yoshioka et al. | ............... | 180/233 |
| 5,813,491 A * | 9/1998 | Sato et al. | ............... | 180/309 |
| 6,070,689 A * | 6/2000 | Tanaka et al. | ............... | 180/291 |
| 6,173,800 B1 * | 1/2001 | Steenackers et al. | ............... | 180/89.2 |
| 6,206,128 B1 * | 3/2001 | Hattori et al. | ............... | 180/244 |

(Continued)

FOREIGN PATENT DOCUMENTS

DE    42 22 035 A1    1/1994

(Continued)

*Primary Examiner* — Paul N Dickson
*Assistant Examiner* — Karen A Beck
(74) *Attorney, Agent, or Firm* — Oliff & Berridge, PLC

(57) ABSTRACT

According to a present powertrain, a first rotation shaft serving as an input shaft of a front side gear mechanism is located in a portion of a vehicle lower than a second rotation shaft serving as an output shaft, so that a crankshaft of an engine provided coaxially with the first rotation shaft is located in a portion of the vehicle lower than in a conventional example. Solely the engine having a heavy mass is thus disposed in a lower portion, so as to achieve a lower position of the center of gravity of the vehicle. In this manner, a powertrain having a layout structure attaining lower center of gravity as well as high rigidity of a body and improvement in aerodynamic characteristics is provided.

7 Claims, 2 Drawing Sheets

U.S. PATENT DOCUMENTS

| | | | |
|---|---|---|---|
| 6,260,652 B1 * | 7/2001 | Steenackers et al. | 180/296 |
| 6,386,348 B1 * | 5/2002 | Kunii | 192/35 |
| 6,536,548 B2 * | 3/2003 | Steenackers et al. | 180/89.2 |
| 6,595,312 B2 | 7/2003 | Yoshioka | |
| 6,702,706 B2 * | 3/2004 | Kobayashi | 475/200 |
| 6,892,847 B2 * | 5/2005 | Seiki | 180/376 |
| 6,896,087 B2 * | 5/2005 | Korenjak et al. | 180/292 |
| 7,401,676 B2 * | 7/2008 | Kim | 180/376 |
| 7,475,754 B2 * | 1/2009 | Misaki et al. | 180/309 |
| 7,530,420 B2 * | 5/2009 | Davis et al. | 180/233 |
| 7,690,661 B2 * | 4/2010 | Tsuruta et al. | 280/124.135 |
| 7,779,957 B2 * | 8/2010 | Mitake | 180/312 |
| 2001/0052432 A1 | 12/2001 | Yoshioka | |
| 2004/0216942 A1 * | 11/2004 | Tanaka et al. | 180/292 |
| 2005/0061573 A1 * | 3/2005 | Mizuno et al. | 180/376 |
| 2005/0103558 A1 * | 5/2005 | Davis et al. | 180/383 |
| 2007/0045034 A1 * | 3/2007 | Kim | 180/379 |
| 2008/0173495 A1 * | 7/2008 | Komatsu et al. | 180/344 |
| 2008/0223651 A1 * | 9/2008 | Smith et al. | 180/376 |

FOREIGN PATENT DOCUMENTS

| | | |
|---|---|---|
| EP | 0 327 761 A1 | 8/1989 |
| EP | 1 164 044 A2 | 12/2001 |
| FR | 879080 A | 2/1943 |
| FR | 2 603 529 A1 | 3/1988 |
| FR | A-02-241828 | 9/1990 |
| JP | A-63-067332 | 5/1988 |
| JP | A-1-247224 | 10/1989 |
| JP | A-03-235721 | 10/1991 |
| JP | A-05-085102 | 4/1993 |
| JP | A-05-169992 | 7/1993 |
| JP | A-05-294151 | 11/1993 |
| JP | A-07-223449 | 8/1995 |
| JP | A-07-266902 | 10/1995 |
| JP | A-2001-354161 | 12/2001 |
| JP | A-2005-112156 | 4/2005 |

* cited by examiner

FIG.4
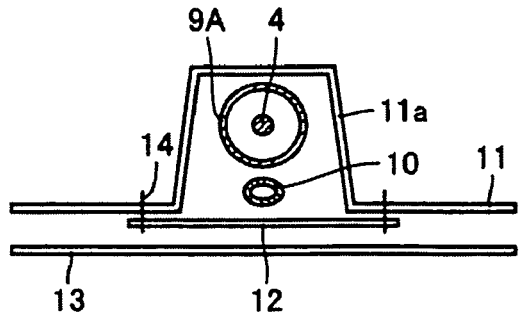
FIG.5
ARRANGEMENT COMBINATION
| | Fr SIDE | Rr SIDE |
|---|---|---|
| 1 | A PAIR OF GEARS | PARALLEL TWO-AXLE TRANSMISSION INCLUDING A PLURALITY OF PAIRS OF GEARS |
| 2 | PARALLEL TWO-AXLE TRANSMISSION INCLUDING A PLURALITY OF PAIRS OF GEARS | A PAIR OF GEARS |
| 3 | PARALLEL TWO-AXLE TRANSMISSION INCLUDING A PLURALITY OF PAIRS OF GEARS | PARALLEL TWO-AXLE TRANSMISSION INCLUDING A PLURALITY OF PAIRS OF GEARS |
FIG.6
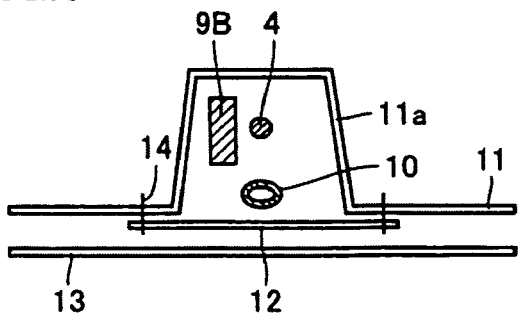

POWERTRAIN

TECHNICAL FIELD

The present invention relates to a layout structure of a powertrain of an automobile.

BACKGROUND ART

For operation performance of an automobile, it is very important to achieve higher rigidity of a body and improvement in aerodynamic characteristics while the center of gravity of the automobile is located in a lower position. Such a demand is strong particularly in a sports car. Conventionally, in a front engine rear drive vehicle, what is called a tunnel structure extending from front to rear of the vehicle for the purpose of allowing passage of a propeller shaft is adopted in a front panel. Moreover, in order to suppress lowering in the rigidity of the body due to adoption of the tunnel structure, a reinforcing member is additionally provided. There is a limit, however, to further higher rigidity of the body because of restriction on layout of a driveline and an exhaust pipe.

The vehicle desirably has a completely flat bottom face, in order to improve its aerodynamic characteristics. On the other hand, if a structure in which the exhaust pipe is completely covered is adopted, it is necessary to position the entire powertrain higher from the ground, from a viewpoint of ensuring ground clearance. In particular, if an engine with a heavy mass is positioned higher, the center of gravity of the vehicle is also higher.

Meanwhile, it is effective to dispose the engine with a heavy mass in further lower portion of the vehicle, in order to achieve lower center of gravity of the vehicle for the purpose of improving the operation performance of the vehicle. In order to dispose the engine in a further lower portion of the vehicle, however, the entire powertrain should also be lowered. In such a case, apparatuses constituting the powertrain may interfere with the exhaust pipe or an undercover provided on the bottom face of the vehicle. In addition, as a lowermost area of the entire powertrain is further lowered, the ground clearance is not ensured.

Japanese Patent Laying-Open No. 03-235721 discloses a powertrain for use in a 4WD vehicle based on FR (front engine rear wheel drive), in which a crankshaft of an engine, a propeller shaft, and an input shaft of a transmission are coaxially provided. In addition, in the powertrain structured as above, generally, an exhaust pipe and an undercover are disposed below the powertrain.

DISCLOSURE OF THE INVENTION

The present invention was made to solve the above-described problems that arise in connection with the layout structure of the powertrain when the engine is disposed in a further lower portion of the vehicle. Therefore, an object of the present invention is to provide a powertrain having a layout structure capable of attaining a lower center of gravity as well as high rigidity of a body and improvement in aerodynamic characteristics.

A powertrain according to the present invention is incorporated in a vehicle, and transmits driving force from an engine to a differential gear through a clutch and a propeller shaft provided in a rear of the clutch. The powertrain includes a front side gear mechanism supplying an input from the clutch to the propeller shaft, and a rear side gear mechanism supplying an input from the propeller shaft to the differential gear. The front side gear mechanism has an input shaft positioned in a portion of the vehicle lower than an output shaft of the front side gear mechanism.

The powertrain further includes a front side gear housing containing the front side gear mechanism and a rear side gear housing containing the rear side gear mechanism. The front side gear housing and the rear side gear housing are connected to each other through a structured body. In the powertrain, the structured body is a torque tube in which the propeller shaft is inserted.

In the powertrain, the vehicle has a floor panel including a floor tunnel, the floor tunnel extending in a front-rear direction in a central region of the vehicle, projecting upward, and opening toward below. The engine has an exhaust pipe extending toward the rear of the vehicle for emitting exhaust gas to the outside. The propeller shaft and the structured body are positioned in a portion of the vehicle higher than the exhaust pipe. The propeller shaft, the structured body, and the exhaust pipe are arranged in a manner accommodated in the floor tunnel. In addition, the powertrain further includes an underplate attached to the floor panel and at least partially or entirely covering the opening of the floor tunnel.

Moreover, the powertrain further includes an undercover covering a bottom side of the powertrain.

Furthermore, in the powertrain, the front side gear mechanism is implemented by a pair of gears or a parallel two-axle transmission including a plurality of pairs of gears, and the rear side gear mechanism is implemented by a pair of gears or a parallel two-axle transmission including a plurality of pairs of gears.

In addition, in the powertrain, the front side gear mechanism is a deceleration mechanism decelerating the input from the clutch and outputting the decelerated input to the propeller shaft.

Moreover, in the powertrain, the front side gear mechanism is an acceleration mechanism accelerating the input from the clutch and outputting the accelerated input to the propeller shaft.

According to the powertrain of the present invention, the input shaft of the front side gear mechanism is provided in a portion of the vehicle lower than the output shaft of the front side gear mechanism, so that the crankshaft of the engine provided coaxially with the input shaft of the front side gear mechanism is located in a portion of the vehicle lower than in a conventional example. Consequently, solely the engine with a heavy mass can be disposed further below, while avoiding interference between the propeller shaft and the exhaust pipe. In this manner, the center of gravity of the entire vehicle can be lowered.

In addition, according to the powertrain, the front side gear housing and the rear side gear housing are connected to each other through the structured body, so that an integrally connected rigid body from the engine to the differential gear can be obtained. Consequently, a driver will have a rigid shift feeling during driving of the vehicle, as well as a feeling of direct response between a power system and the vehicle at the time of start and acceleration. Suppression of vibration transmission to a vehicle body and noise can also be expected.

Moreover, according to the powertrain, the propeller shaft, the structured body, and the exhaust pipe are arranged in a manner accommodated in the floor tunnel. As a larger dimension in a direction of width of the vehicle is thus suppressed, a seat position can further be lowered while ensuring an interior space in the vehicle. In addition, as there is no apparatus projecting downward from a bottom face of the floor panel, the bottom face of the underplate can be flat. Rigidity against torsion or the like of the vehicle can also be enhanced. Even if an undercover for covering a bottom side of the powertrain is provided, the entire undercover can be flat and further improvement in rigidity of the vehicle is achieved. Moreover, air resistance is lowered, and the aerodynamic characteristics of the vehicle can be improved.

Furthermore, a pair of gears or a parallel two-axle transmission including a plurality of pairs of gears is selectively adopted in the front side gear mechanism and the rear side gear mechanism respectively, so that weight distribution to the front and the rear of the vehicle can be optimized.

In addition, the deceleration mechanism decelerating the input from the clutch and outputting the decelerated input to the propeller shaft is adopted in the front side gear mechanism, so that the number of revolutions of the propeller shaft and subsequent apparatuses can be reduced. Improvement in lubrication performance and lowering in resistance in oil stirring in the rear side gear mechanism provided on a rear side can thus be achieved.

Moreover, the acceleration mechanism accelerating the input from the clutch and outputting the accelerated input to the propeller shaft is adopted in the front side gear mechanism, so that reduction of an input torque in the rear side gear mechanism provided on the rear side as well as reduction in size of the rear side gear mechanism can be achieved.

BRIEF DESCRIPTION OF THE DRAWINGS

FIG. 4 is a cross-sectional view along the line IV-IV in a direction of an arrow in FIG. 3.

FIG. 5 shows types of arrangement combination for selectively adopting a pair of gears or a parallel two-axle transmission including a plurality of pairs of gears in a front side gear mechanism and a rear side gear mechanism.

FIG. 6 is a cross-sectional view showing another example of a structured body.

BEST MODES FOR CARRYING OUT THE INVENTION

In the following, a powertrain according to each embodiment of the present invention will be described with reference to the drawings. Each drawing shows an example in which a powertrain according to the present invention is adopted in an FR (front engine rear wheel drive) automobile. In addition, for the sake of better understanding of features according to the present invention, solely portions relevant to the present invention are schematically illustrated.

First Embodiment

Initially, a powertrain 100 in a first embodiment will be described with reference to FIGS. 1 and 2.

(Powertrain 100)

Figure 1:
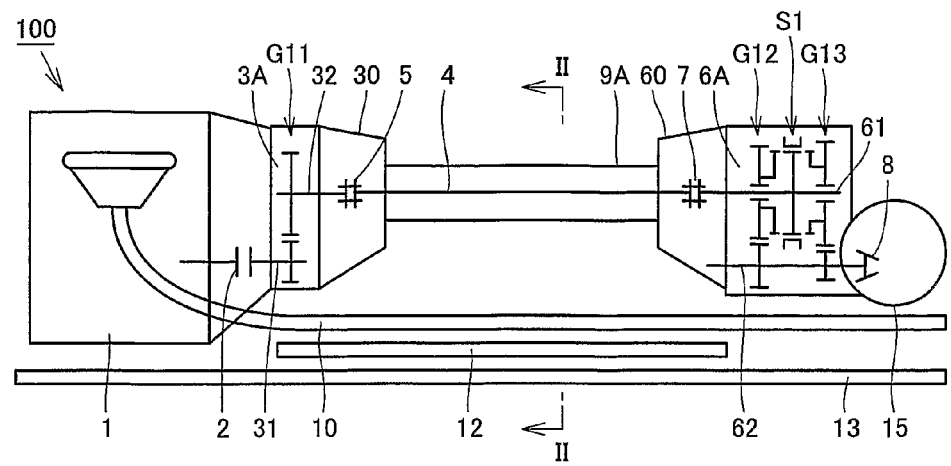
FIG. 1 is an overall side view schematically showing a structure of a powertrain incorporated in a vehicle according to a first embodiment.
Figure 2:
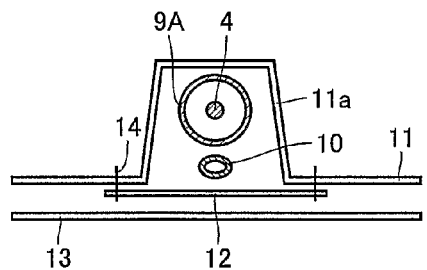
FIG. 2 is a cross-sectional view along the line II-II in a direction of an arrow in FIG. 1.

Referring to FIGS. 1 and 2, powertrain 100 according to the present embodiment includes a clutch 2 connected to an engine 1, a front side gear mechanism 3A connected to clutch 2, a propeller shaft 4 connected to front side gear mechanism 3A, a rear side gear mechanism 6A connected to propeller shaft 4, and a differential gear 8 connected to rear side gear mechanism 6A. Driving force from differential gear 8 is transmitted to a rear wheel 15 through an axle shaft (not shown).

An exhaust pipe 10 extending to the rear of the vehicle, for emitting exhaust gas to the outside, is connected to engine 1. In addition, a floor panel 11 (for the sake of convenience of description, shown only in FIG. 2), an underplate 12, and an undercover 13 are provided on a bottom face side of the vehicle.

(Front Side Gear Mechanism 3A)

Front side gear mechanism 3A includes a first rotation shaft 31 receiving driving force from clutch 2 and a second rotation shaft 32 for outputting driving force to propeller shaft 4. Second rotation shaft 32 is connected to propeller shaft 4 through a flange 5. A first transmission gear pair G11 implementing a deceleration mechanism decelerating the input from clutch 2 and supplying the decelerated input to propeller shaft 4 is provided between first rotation shaft 31 and second rotation shaft 32. Front side gear mechanism 3A is contained in a front side gear housing 30.

First rotation shaft 31 is provided in a portion of the vehicle lower than second rotation shaft 32. In the present embodiment, first rotation shaft 31 is provided in an area directly below second rotation shaft 32. Though FIG. 1 illustrates first transmission gear pair G11 implementing the deceleration mechanism, a constant velocity mechanism supplying the input from clutch 2 to propeller shaft 4 while maintaining a constant velocity thereof or an acceleration mechanism accelerating the input from clutch 2 and supplying the accelerated input to propeller shaft 4 may be adopted.

Front side gear mechanism 3A is caused to serve as the deceleration mechanism, so that the number of revolutions in propeller shaft 4 and subsequent apparatuses can be reduced. In addition, improvement in lubrication performance and lowering in resistance in oil stirring in rear side gear mechanism 6A provided on the rear side can be achieved. Meanwhile, front side gear mechanism 3A is caused to serve as the acceleration mechanism, so that reduction of an input torque in rear side gear mechanism 6A provided on the rear side as well as reduction in size of the rear side gear mechanism can be achieved.

(Rear Side Gear Mechanism 6A)

Rear side gear mechanism 6A includes a third rotation shaft 61 receiving driving force from propeller shaft 4 and a fourth rotation shaft 62 for outputting driving force to differential gear 8. Third rotation shaft 61 is connected to propeller shaft 4 through a flange 7. A parallel two-axle transmission having a second transmission gear pair G12, a hub sleeve S1, and a third transmission gear pair G13 is adopted between third rotation shaft 61 and fourth rotation shaft 62. Rear side gear mechanism 6A is contained in a rear side gear housing 60.

Fourth rotation shaft 62 is provided in a portion of the vehicle lower than third rotation shaft 61. In the present embodiment, fourth rotation shaft 62 is provided in an area directly below third rotation shaft 61. Though second transmission gear pair G12 and third transmission gear pair G13 both serve as the acceleration mechanism accelerating the input from propeller shaft 4 and outputting the accelerated input to fourth rotation shaft 62 in FIG. 1, a constant velocity mechanism supplying the input from propeller shaft 4 to fourth rotation shaft 62 while maintaining a constant velocity thereof, a deceleration mechanism decelerating the input from propeller shaft 4 and supplying the decelerated input to fourth rotation shaft 62, or a combination thereof may be adopted.

(Connection Through Structured Body)

Front side gear housing 30 and rear side gear housing 60 are connected to each other through a cylindrical torque tube 9A representing a structured body. Propeller shaft 4 is contained in torque tube 9A. Front side gear housing 30 and rear side gear housing 60 are thus connected to each other through torque tube 9A, so that an integrally connected rigid body from engine 1 to differential gear 8 can be obtained. Consequently, a driver will have a rigid shift feeling during driving of the vehicle, as well as a feeling of direct response between the power system and the vehicle at the time of start and acceleration. In addition, suppression of vibration transmission to the vehicle body and noise can be expected.

Moreover, propeller shaft 4 is contained in torque tube 9A, so that propeller shaft 4 that revolves at a high speed can be protected against weather, dirt, salt damage, flying stone, or the like. That is, durability of propeller shaft 4 can be improved.

(Bottom Face Structure of Vehicle)

In the present embodiment, as shown in FIG. 2, a floor tunnel 11a that extends in a front-rear direction in a central region, projects upward, and opens toward below is provided in floor panel 11. Torque tube 9A containing propeller shaft 4 is arranged within floor tunnel 11a, and exhaust pipe 10 is arranged below torque tube 9A.

An opening area of floor tunnel 11a is covered with underplate 12, which is fixed to floor panel 11 by means of a bolt 14 or the like. Various types of underplate 12 such as a single-plate type completely covering the opening area of floor tunnel 11a or a type constituted of a plurality of bands in order to permit partial opening may be adopted.

As torque tube 9A and exhaust pipe 10 are contained in floor tunnel 11a, underplate 12 having a flat plate shape may be adopted. In addition, undercover 13 covering the bottom side of the powertrain is fixed to a car body frame (not shown), in a portion below underplate 12. As underplate 12 can be flat, undercover 13 also having a flat plate shape can be adopted.

As described above, torque tube 9A and exhaust pipe 10 are contained in floor tunnel 11a vertically, so that a larger dimension in a direction of width of the vehicle is suppressed, and a seat position can further be lowered while ensuring an interior space in the vehicle. In addition, as there is no apparatus projecting downward from the bottom face of floor panel 11, the bottom face of underplate 12 can be flat. Rigidity against torsion or the like of the vehicle can also be enhanced. Moreover, undercover 13 covering the bottom side of powertrain 100 can entirely be flat and further improvement in rigidity of the vehicle is achieved. Furthermore, air resistance is lowered, and the aerodynamic characteristics of the vehicle can be improved.

(Function and Effect)

According to powertrain 100 of the present embodiment, first rotation shaft 31 serving as the input shaft of front side gear mechanism 3A is provided in a portion of the vehicle lower than second rotation shaft 32 serving as the output shaft, so that the crankshaft of engine 1 provided coaxially with first rotation shaft 31 can be located in a portion of the vehicle lower than in a conventional example. Consequently, solely engine 1 with a heavy mass can be disposed further below, while avoiding interference between propeller shaft 4 and exhaust pipe 10. In this manner, the center of gravity of the entire vehicle can be lowered.

Second Embodiment

A powertrain 200 according to a second embodiment will now be described with reference to FIGS. 3 and 4.

(Powertrain 200)

A basic structure of powertrain 200 according to the present embodiment is similar to that of powertrain 100 in the first embodiment described above. On the other hand, the present embodiment is different from the first embodiment in the structure of a gear train adopted in a front side gear mechanism 3B and a rear side gear mechanism 6B. Therefore, in the following, a structure of front side gear mechanism 3B and rear side gear mechanism 6B adopted in the second embodiment will be described in detail.

Figure 3:
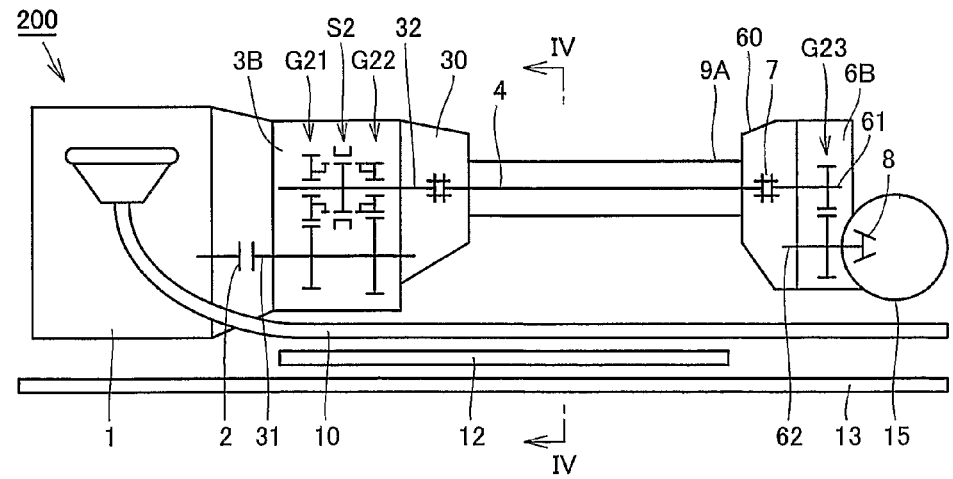
FIG. 3 is an overall side view schematically showing a structure of a powertrain incorporated in a vehicle according to a second embodiment.

Referring to FIGS. 3 and 4, though a pair of gears has been adopted as the gear train in the first embodiment, a parallel two-axle transmission including a plurality of pairs of gears is adopted in front side gear mechanism 3B and rear side gear mechanism 6B in the present embodiment.

(Front Side Gear Mechanism 3B)

Front side gear mechanism 3B includes first rotation shaft 31 receiving driving force from clutch 2 and second rotation shaft 32 for outputting driving force to propeller shaft 4. Second rotation shaft 32 is connected to propeller shaft 4 through flange 5. A parallel two-axle transmission having a fourth transmission gear pair G21, a hub sleeve S2, and a fifth transmission gear pair G22 is adopted between first rotation shaft 31 and second rotation shaft 32. Front side gear mechanism 3B is contained in front side gear housing 30.

First rotation shaft 31 is provided in a portion of the vehicle lower than second rotation shaft 32. In the present embodiment, first rotation shaft 31 is provided in an area directly below second rotation shaft 32. Though fourth transmission gear pair G21 and fifth transmission gear pair G22 both serve as the acceleration mechanism accelerating the input from first rotation shaft 31 and outputting the accelerated input to fourth rotation shaft 62 in FIG. 3, a constant velocity mechanism supplying the input from first rotation shaft 31 to fourth rotation shaft 62 while maintaining a constant velocity thereof, a deceleration mechanism decelerating the input from first rotation shaft 31 and supplying the decelerated input to fourth rotation shaft 62, or a combination thereof may be adopted.

(Rear Side Gear Mechanism 6B)

Rear side gear mechanism 6B includes third rotation shaft 61 receiving driving force from propeller shaft 4 and fourth rotation shaft 62 for outputting driving force to differential gear 8. A sixth transmission gear pair G23 is provided between third rotation-shaft 61 and fourth rotation shaft 62. Rear side gear mechanism 6B is contained in rear side gear housing 60.

Fourth rotation shaft 62 is provided in a portion of the vehicle lower than third rotation shaft 61, as in the first embodiment. In the present embodiment, fourth rotation shaft 62 is provided in an area directly below third rotation shaft 61. Though FIG. 3 illustrates sixth transmission gear pair G23 implementing the deceleration mechanism, a constant velocity mechanism supplying the input from propeller shaft 4 to fourth rotation shaft 62 while maintaining a constant velocity thereof or an acceleration mechanism accelerating the input from propeller shaft 4 and supplying the accelerated input to fourth rotation shaft 62 may be adopted.

(Function and Effect)

As described above, powertrain 200 according to the present embodiment can also achieve a function and effect similar to that achieved by powertrain 100 according to the first embodiment. In addition, transmission mechanisms are disposed in a manner distributed in front side gear mechanism 3B and rear side gear mechanism 6B, so that the transmission mechanism can be reduced in size. Moreover, a plurality of types of combination of gear ratio (4×3, for example) are provided, so that selection of a drive condition adapted to a situation for driving the vehicle can be allowed.

In the description above, a pair of gears is adopted in the front side gear mechanism and a parallel two-axle transmission is adopted in the rear side gear mechanism in the first embodiment, while a parallel two-axle transmission is adopted in the front side gear mechanism and a pair of gears is adopted in the rear side gear mechanism in the second embodiment. As shown in FIG. 5, however, a parallel two-axle transmission including a plurality of pairs of gears may be adopted in the front side gear mechanism and the rear side gear mechanism, in order to achieve optimal weight distribution to the front and the rear of the vehicle. In addition, a gear or a transmission structured in a different manner may be adopted, without limited to a pair of gears or a parallel two-axle transmission including a plurality of pairs of gears.

Moreover, though torque tube 9A has been adopted as the structured body connecting front side gear housing 30 to rear side gear housing 60 in each embodiment described above, the structured body is not limited to torque tube 9A. For example, as shown in FIG. 6, a frame member 9B disposed in parallel to propeller shaft 4 may be employed. A channel iron, an I-beam, an H-beam, a truss frame, or the like may serve as frame member 9B.

It is noted that a structured body connecting front side gear housing 30 to rear side gear housing 60 is not necessary in a vehicle not requiring improvement in a rigid shift feeling of a driver, or a feeling of direct response between the power system and the vehicle at the time of start and acceleration.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A powertrain incorporated in a front engine rear wheel drive only vehicle, for transmitting driving force from an engine to a differential gear through a clutch and a propeller shaft provided in a rear of the clutch, comprising:
    a front side gear mechanism supplying an input from said clutch to said propeller shaft;
    a rear side gear mechanism supplying an input from said propeller shaft to said differential gear;
    a front side gear housing containing said front side gear mechanism and a rear side gear housing containing said rear side gear mechanism;
    a floor panel of the vehicle including a floor tunnel, the floor tunnel extending in a front-rear direction in a central region of the vehicle, projecting upward, and opening toward below; and
    an underplate attached to said floor panel and at least partially or entirely covering the opening of said floor tunnel, wherein
    said front side gear mechanism has an input shaft positioned in a portion of the front engine rear wheel drive only vehicle lower than an output shaft of said front side gear mechanism,
    said front side gear housing and said rear side gear housing are rigidly connected to each other through a structured body,
    said engine has an exhaust pipe extending toward the rear of the vehicle for emitting exhaust gas to outside,
    said propeller shaft and said structured body are positioned in a portion of the vehicle higher than said exhaust pipe, and
    said propeller shaft, said structured body, and said exhaust pipe are arranged in a manner accommodated in said floor tunnel.

2. The powertrain according to claim 1, wherein said structured body is a torque tube in which said propeller shaft is inserted.

3. The powertrain according to claim 1, further comprising an undercover covering a bottom side of the powertrain.

4. The powertrain according to claim 1, wherein
    said front side gear mechanism is implemented by a pair of gears or a parallel two-axle transmission including a plurality of pairs of gears, and
    said rear side gear mechanism is implemented by a pair of gears or a parallel two-axle transmission including a plurality of pairs of gears.

5. The powertrain according to claim 1, wherein said front side gear mechanism is a deceleration mechanism decelerating the input from said clutch and outputting the decelerated input to said propeller shaft.

6. The powertrain according to claim 1, wherein said front side gear mechanism is an acceleration mechanism accelerating the input from said clutch and outputting the accelerated input to said propeller shaft.

7. The powertrain according to claim 2, further comprising an undercover covering a bottom side of the powertrain.

* * * * *